(12) United States Patent
Ramesh

(10) Patent No.: US 11,773,315 B2
(45) Date of Patent: Oct. 3, 2023

(54) WELL TREATMENT METHODS

(71) Applicant: SCHLUMBERGER TECHNOLOGY CORPORATION, Sugar Land, TX (US)

(72) Inventor: Avinash Ramesh, Houston, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

(21) Appl. No.: 16/081,981

(22) PCT Filed: Mar. 1, 2017

(86) PCT No.: PCT/US2017/020069
§ 371 (c)(1),
(2) Date: Sep. 4, 2018

(87) PCT Pub. No.: WO2017/151694
PCT Pub. Date: Sep. 8, 2017

(65) Prior Publication Data
US 2019/0093006 A1 Mar. 28, 2019

Related U.S. Application Data

(60) Provisional application No. 62/301,949, filed on Mar. 1, 2016.

(51) Int. Cl.
*C09K 8/70* (2006.01)
*C09K 8/68* (2006.01)
*C09K 8/035* (2006.01)

(52) U.S. Cl.
CPC ............... *C09K 8/70* (2013.01); *C09K 8/035* (2013.01); *C09K 8/68* (2013.01); *C09K 2208/08* (2013.01)

(58) Field of Classification Search
CPC . C09K 8/70; C09K 8/035; C09K 8/68; C09K 2208/08
USPC ........................................................ 166/305.1
See application file for complete search history.

(56) References Cited

U.S. PATENT DOCUMENTS

| | | | |
|---|---|---|---|
| 1,916,531 A | 7/1933 | Robb | |
| 2,005,800 A | 6/1935 | Thomas | |
| 2,478,079 A | 8/1949 | Beasley et al. | |
| 2,638,252 A | 5/1953 | Elmer | |
| 4,023,706 A | 5/1977 | Dearlove et al. | |
| 4,285,601 A | 8/1981 | Miner | |
| 4,390,371 A | 6/1983 | Cornwell | |
| 4,453,829 A | 6/1984 | Althouse, III | |
| 4,808,004 A | 2/1989 | McIntire et al. | |

(Continued)

FOREIGN PATENT DOCUMENTS

| | | |
|---|---|---|
| RU | 2228842 C2 | 5/2004 |
| WO | 2012155045 A2 | 11/2012 |
| WO | 2013085410 A1 | 6/2013 |

OTHER PUBLICATIONS

International Search Report and Written Opinion issued in International Patent Application No. PCT/US2017/020069 dated Jun. 2, 2017; 11 pages.

*Primary Examiner* — Matthew R Buck
*Assistant Examiner* — Patrick F Lambe
(74) *Attorney, Agent, or Firm* — Jeffrey D. Frantz

(57) ABSTRACT

Methods include delivering a well treatment fluid comprising wellsite material contained within a water soluble degradable package, mixing the well treatment fluid, and pumping the mixed well treatment fluid downhole.

16 Claims, 1 Drawing Sheet

(56) References Cited

U.S. PATENT DOCUMENTS

| | | |
|---|---|---|
| 4,848,467 A | 7/1989 | Cantu et al. |
| 4,946,339 A | 8/1990 | Berg et al. |
| 4,957,165 A | 9/1990 | Cantu et al. |
| 4,986,355 A | 1/1991 | Casad et al. |
| 5,030,314 A | 7/1991 | Lang |
| 5,091,255 A | 2/1992 | Hsu et al. |
| 5,190,374 A | 3/1993 | Harms et al. |
| 5,224,774 A | 7/1993 | Valle et al. |
| 5,807,458 A | 9/1998 | Sanders et al. |
| 5,931,610 A | 8/1999 | Rixom et al. |
| 5,985,449 A | 11/1999 | Dill |
| 6,283,327 B1 | 9/2001 | Rubtsov |
| 6,348,093 B1 | 2/2002 | Rieder et al. |
| 6,550,362 B1 | 4/2003 | Galinat et al. |
| 6,898,921 B2 * | 5/2005 | Duffield ............... B65B 9/042 53/452 |
| 6,945,686 B2 | 9/2005 | Dewinter |
| 7,042,272 B2 | 5/2006 | Dornbusch |
| 7,049,272 B2 * | 5/2006 | Sinclair ............... C09K 8/516 166/305.1 |
| 7,490,449 B1 | 2/2009 | Eibert |
| 7,906,597 B2 | 3/2011 | Fouarge |
| 8,109,456 B2 | 2/2012 | Christensen |
| 8,322,424 B2 | 12/2012 | Leugemors et al. |
| 8,322,600 B2 | 12/2012 | Vitt |
| 8,545,091 B1 | 10/2013 | Arribau |
| 9,016,377 B2 | 4/2015 | Leugemors et al. |
| 2002/0013243 A1 * | 1/2002 | Hewitt ............... C11D 17/0004 510/293 |
| 2004/0014607 A1 | 1/2004 | Sinclair et al. |
| 2004/0109384 A1 | 6/2004 | Dewinter |
| 2004/0115378 A1 | 6/2004 | Dunaway et al. |
| 2007/0014185 A1 | 1/2007 | Diosse et al. |
| 2007/0081866 A1 | 4/2007 | Deal et al. |
| 2008/0135245 A1 | 6/2008 | Smith et al. |
| 2008/0179054 A1 | 7/2008 | McGough et al. |
| 2008/0179092 A1 | 7/2008 | Fragachan |
| 2008/0245527 A1 | 10/2008 | Leugemors et al. |
| 2009/0075845 A1 * | 3/2009 | Abad ............... C09K 8/12 507/117 |
| 2009/0148632 A1 | 6/2009 | Danielsson et al. |
| 2010/0038077 A1 | 2/2010 | Heilman et al. |
| 2010/0188926 A1 | 7/2010 | Stegemoeller et al. |
| 2010/0243252 A1 | 9/2010 | Luharuka et al. |
| 2011/0024129 A1 | 2/2011 | Turakhia et al. |
| 2011/0061855 A1 | 3/2011 | Case et al. |
| 2011/0155373 A1 | 6/2011 | Goddard et al. |
| 2012/0199356 A1 | 8/2012 | Nichols |
| 2012/0227967 A1 | 9/2012 | Shaikh et al. |
| 2012/0231982 A1 | 9/2012 | Weinstein et al. |
| 2012/0285695 A1 * | 11/2012 | Lafferty ............... C09K 8/03 166/310 |
| 2013/0092377 A1 | 4/2013 | Leugemors et al. |
| 2013/0105166 A1 | 5/2013 | Medvedev et al. |
| 2013/0195787 A1 * | 8/2013 | Combs ............... C08L 1/16 424/70.13 |
| 2014/0000891 A1 | 1/2014 | Mahoney et al. |
| 2014/0034310 A1 | 2/2014 | Andersen |
| 2014/0041317 A1 | 2/2014 | Pham et al. |
| 2014/0041319 A1 | 2/2014 | Pham et al. |
| 2014/0041322 A1 | 2/2014 | Pham et al. |
| 2014/0102301 A1 | 4/2014 | Marks et al. |
| 2014/0102695 A1 | 4/2014 | Adil et al. |
| 2015/0075796 A1 | 3/2015 | Lecerf et al. |
| 2015/0103869 A1 | 4/2015 | Moscato et al. |
| 2015/0135817 A1 | 5/2015 | Moscato et al. |
| 2015/0167447 A1 | 6/2015 | Tjhang et al. |
| 2015/0192006 A1 | 7/2015 | Ramesh et al. |
| 2015/0198015 A1 | 7/2015 | Barreto et al. |
| 2015/0361775 A1 | 12/2015 | Pham |
| 2016/0168443 A1 * | 6/2016 | Lafitte ............... C09K 8/68 507/112 |
| 2017/0204316 A1 * | 7/2017 | Pop ............... C09D 133/00 |

* cited by examiner

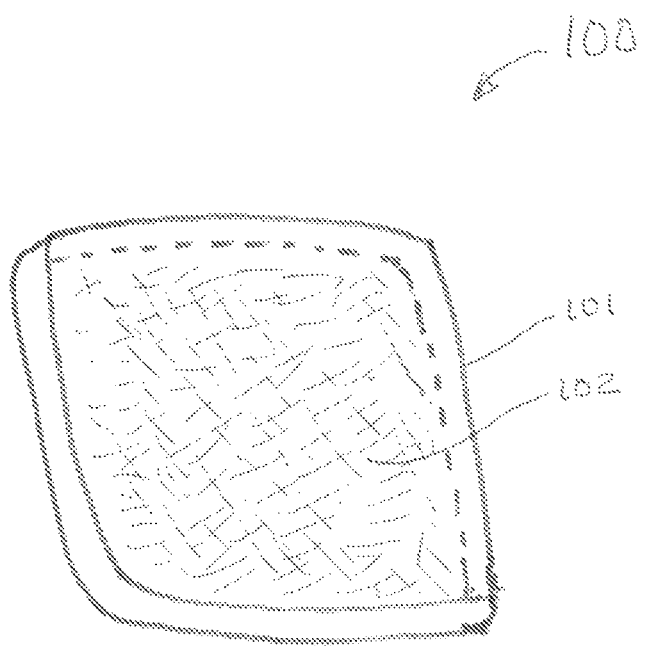

WELL TREATMENT METHODS

The present application claims priority to Provisional Application Ser. No. 62/301,949 filed on Mar. 1, 2016, which is incorporated herein by reference in its entirety.

BACKGROUND

Drilling, cementing, stimulation, and various treatments, including workover operations, of oil and gas wells frequently require using various chemical additives.

Various fluids may be delivered to the wellsite to perform wellsite operations. For example, during drilling, drilling fluids (e.g., muds) may be pumped into the wellbore to facilitate drilling and/or to line the wellbore. In another example, during production, treatment/stimulation fluid may be injected into the formation to fracture the formations. Such injected treatment/stimulation fluid may include, for example, acids to enhance the fractures, proppants to prop open the fractures, and the like. Various techniques known in the art may be used to deliver the treatment/stimulation fluid to the wellsite.

Chemical additives may be delivered in a variety of shapes such as particles, rod, blobs, flocs, and have various aspects ratios. For example, the use of high aspect ratio particles has been recognized as being beneficial in a multitude of applications such as proppant transport, loss circulation, fluid loss, diversion and others.

Delivery of the chemical additives has been a challenge in the industry for many years since the nature, shape, density, or characteristics of the chemical additives may create issues in transporting such additives to the wellsite, delivering them through wellsite equipment, or for mixing them in the desired treatment fluid.

SUMMARY

In embodiments, methods disclosed herein include delivering a well treatment fluid comprising wellsite material contained within a water soluble degradable package, mixing the well treatment fluid, and pumping the mixed well treatment fluid downhole.

In other embodiments, methods of delivering fibers into a well treatment fluid disclosed herein include providing an aqueous based treatment fluid, adding a degradable package containing the fibers into the treatment fluid, and mixing the treatment fluid.

BRIEF DESCRIPTION OF THE DRAWINGS

FIG. 1 is an illustration of a degradable package containing a wellsite material.

DETAILED DESCRIPTION

The description and examples are presented solely for the purpose of illustrating some embodiments and should not be construed as a limitation to the scope and applicability. Although some of the following discussion emphasizes diversion in fracturing, the destructible container and method may be used in many other wellbore operations. Some embodiments shall be described in terms of treatment of horizontal wells, but are equally applicable to wells of any orientation. Some embodiments shall be described for hydrocarbon production wells, but it is to be understood that they may be used for wells for production of other fluids, such as water or carbon dioxide, or, for example, for injection or storage wells. It should also be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventors have possession of the entire range and all points within the range.

The present disclosure relates to water soluble degradable packages to deliver wellsite materials, such as chemical materials into wellbore treatment fluid and methods of using said packages. The disclosure comprises introducing the water soluble degradable packages containing chemicals or materials into the pumping line.

"Wellsite materials" as used herein may refer to wellsite fluids, wellbore fluids, and/or solids, such as chemicals, proppants, fibers, slurries and/or drilling muds. By way of example, the wellsite materials may include solid proppant added to fracturing fluid, solid and/or liquid chemical additives added to fracturing slurry (e.g., fibers, particulates, crosslinkers, breakers, corrosion inhibitors), fibers and particulates (and other lost circulation materials) added to treatment pills (preventative or remedial), solid hydrofluoric (HF) acid precursor added to acid solution (e.g., hydrofluoric, NH4HF2) for sandstone acidizing, solid cement additives added during cementing operations, and/or other solid and/or liquid wellsite components.

"Degradable packages" may refer to discrete packages of wellsite materials. The wellsite packages may include specified solid and/or liquid components packaged in specified amounts into packaging, such as containers, coatings, plastics, shrink wrap, and/or the like, that are degradable. The packaging may be used to prevent exposure of the wellsite materials to air or other potentially detrimental materials. The packaging may also include components that act as part of the materials used in treatment, and optionally may be reusable. The wellsite packets may be individual packets, a long tubular packet or multiple individual packets joined together in chains or sheets. The wellsite packets may be mixed with fluid(s) to form "wellsite mixtures." Examples of wellsite mixtures may include: stimulation fluid, such as acid; fracturing fluid for hydraulic fracturing, such as proppant laden fluid (gas or liquid, e.g., water), and various additives; drilling mud; cement slurry; treatment fluid, such as surface water treatment; or other wellsite fluids that may or may not include particle(s), fiber(s) or other solids.

"Degradable" may include water-soluble. The packages dissolve in the aqueous treatment fluid thus releasing the wellsite material it contained.

Suitable methods for delivering the degradable packages are disclosed for example in US 2015-0075796 incorporated herein by reference in its entirety.

Using the disclosed degradable packages enable a precise metering of the quantity of wellsite materials to be included into the treatment fluid and also avoid issues that were sometimes difficult to overcome such as dust for low density materials or clumping or metering challenges for high aspect ratios materials.

The packages disclosed herein may be water soluble at ambient temperature. Potential compositions contemplated include packages formed from polyvinyl alcohol and cellulose. Such a combination presents several advantages such as storage. Indeed, known water soluble films or packages are always challenging to store or transport since the ambient moisture used to provoke early deterioration thus necessitating various prevention means such as using a desiccant or detackifier. The presently disclosed packages may solve these issues.

In embodiments, and to facilitate handling and make more flexible the concentrations achievable by adding the present packages 100 into the treatment fluids (FIG. 1), shapes contemplated include squares 101 of 3 inches by 3 inches with a width of about 0.5 to 1 inch. This allows including very precise quantities of wellsite material in the treatment fluid; for example when polylactide fibers 102 are included in the degradable packages, one package would contain about 35 g of fibers.

Once a person skilled in the art has determined the amount of wellsite material to be included in the treatment fluid, the corresponding amount of pouches can be added to the fluid and will readily dissolve on surface thus enabling the mixing and pumping of an appropriate treatment fluid from surface.

When fiber is the main wellsite material, using particle or fiber-holding degradable packages significantly simplifies wellsite delivery. Problems with existing methods of fiber and/or particle delivery based on using screw feeders include, but are not limited to, metering difficulties and plugging of equipment. Wellsite delivery of special materials, such as fibers and/or particles, in degradable packages solves these problems, because such packages may be introduced into the treating fluid with the same techniques as commonly used for proppant or any solid or particulate material. In embodiment fibers and/or particulates are vacuum packed into small bundles (to maximize the concentration) and surrounded by a coating or put into an enclosure, for example shrink-wrapped or vacuum packed.

As mentioned earlier, the degradable packages are soluble in the treatment fluids. Said fluids may be slickwater, flowed back water, brine, viscosified fluids or even crosslinked fluids.

The wellsite materials to be included in the degradable packages may be of any compatible nature, i.e., non degrading the internal layer of the degradable packages.

Nonlimiting examples of wellsite materials that may be contained include certain polymer materials that are capable of generating acids upon degradation. These polymer materials may herein be referred to as "polymeric acid precursors"; they can be used as destructible shell materials or as degradable diverting materials, depending on their properties. These materials are typically solids at room temperature. The polymeric acid precursor materials include the polymers and oligomers that hydrolyze or degrade in certain chemical environments under known and controllable conditions of temperature, time and pH to release organic acid molecules that may be referred to as "monomeric organic acids." As used herein, the expression "monomeric organic acid" or "monomeric acid" may also include dimeric acid or acid with a small number of linked monomer units that function similarly to monomer acids composed of only one monomer unit, in that they are fully in solution at room temperature.

Polymer materials may include those polyesters obtained by polymerization of hydroxycarboxylic acids, such as the aliphatic polyesters of lactic acid, referred to as polylactic acid; of glycolic acid, referred to as polyglycolic acid; of 3-hydroxbutyric acid, referred to as polyhydroxybutyrate; of 2-hydroxyvaleric acid, referred to as polyhydroxyvalerate; of epsilon caprolactone, referred to as polyepsilon caprolactone or polycaprolactone; the polyesters obtained by esterification of hydroxyl aminoacids such as serine, threonine and tyrosine; and the copolymers obtained by mixtures of the monomers listed above. A general structure for the above-described homopolyesters is:

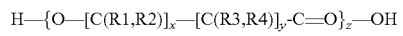

where R1, R2, R3, and R4 are either H, linear alkyl, such as $CH_3$, $CH_2CH_3$ $(CH_2)_nCH_3$, branched alkyl, aryl, alkylaryl, a functional alkyl group (bearing carboxylic acid groups, amino groups, hydroxyl groups, thiol groups, or others) or a functional aryl group (bearing carboxylic acid groups, amino groups, hydroxyl groups, thiol groups, or others);

x is an integer between 1 and 11;

y is an integer between 0 and 10; and z is an integer between 2 and 50,000.

Under appropriate conditions (pH, temperature, water content) polyesters such as those described here may hydrolyze and degrade to yield hydroxycarboxylic acids and compounds such as those acids referred to in the foregoing as "monomeric acids."

One example of a suitable degradable polymeric acid precursor, as mentioned above, is a polyester, such as the polymer of lactic acid, sometimes called polylactic acid, "PLA," polylactate or polylactide. Lactic acid is a chiral molecule and has two optical isomers. These are D-lactic acid and L-lactic acid. The poly(L-lactic acid) and poly(D-lactic acid) forms are generally crystalline in nature. Polymerization of a mixture of the L- and D-lactic acids to poly(DL-lactic acid) results in a polymer that is more amorphous in nature. The polymers described herein are essentially linear. The degree of polymerization of the linear polylactic acid can vary from as few units as necessary to make them solids under downhole conditions to several thousand units (e.g. 2000-5000). Cyclic structures may also be used. The degree of polymerization of these cyclic structures may be smaller than that of the linear polymers. These cyclic structures may include cyclic dimmers if they are solids under storage and wellsite ambient conditions.

Another example is the polymer of glycolic acid (hydroxyacetic acid), also known as polyglycolic acid ("PGA"), or polyglycolide. Other materials suitable as polymeric acid precursors (destructible shell materials or degradable diverting materials, depending on their properties) are all those polymers of glycolic acid with itself or with other hydroxy-acid-containing moieties, for example as described in U.S. Pat. Nos. 4,848,467; 4,957,165; and 4,986,355. Further examples of potential material may be found in US 2012-0285695 incorporated herein by reference in its entirety.

The thickness of the container shell may range from about 50 microns to about 100 microns, or it may be from 60 microns to 80 microns. Optionally, the container may be made with several layers, for example up to about 10 layers, that may be the same or different. In embodiments the internal layer may be made of polyvinyl alcohol film and the outer layer may be made of cellulose film. Additional films may also be used in between for example to tailor the dissolution rate in the aqueous fluid.

A process of preparing water-soluble containers is disclosed in U.S. Pat. No. 6,898,921. The process comprises a) thermoforming a first poly(vinyl alcohol) film having a water content of less than 5% to produce a pocket; b) filling the pocket with a composition; c) placing a second film on the top of the pocket; and d) sealing the first film and the second film together. The process may be adapted for use in some embodiments.

While the invention has been described in only some of its forms, it should be apparent to those skilled in the art that it is not so limited, but is susceptible to various changes and modifications without departing from the scope of the invention.

Accordingly, it is appropriate that the appended claims be construed broadly and in a manner consistent with the scope of the invention.

I claim:

1. A method, comprising:
preparing an aqueous well treatment fluid at a wellsite associated with a well;
at the wellsite, adding one or more water-soluble degradable packages to the aqueous well treatment fluid, wherein the one or more water-soluble degradable packages comprise respective container shells that include a first layer of cellulosic film external to a second layer of polyvinyl alcohol film, and one or more wellsite materials encapsulated by the first layer of cellulosic film and the second layer of polyvinyl alcohol film, the one or more wellsite materials comprising a fiber;
causing the container shells to dissolve at surface to release the one or more wellsite materials into the aqueous well treatment fluid;
mixing the one or more released wellsite materials in the aqueous well treatment fluid at surface; and
pumping the mixed aqueous well treatment fluid into the well.

2. The method of claim 1, wherein the one or more water-soluble degradable packages have a width between about 0.5 inches (in.) to about 1 in.

3. The method of claim 1, wherein the one or more wellsite materials are vacuum packed into the one or more degradable packages.

4. The method of claim 1, wherein the respective container shells have a thickness of about 50 microns to about 100 microns.

5. The method of claim 1, wherein the one or more wellsite materials are disposed within the second layer of polyvinyl alcohol film.

6. The method of claim 1, wherein the one or more wellsite materials further comprise one or more particulates, one or more crosslinkers, one or more breakers, or one or more corrosion inhibiters, or a combination thereof.

7. The method of claim 1, wherein the one or more degradable packages are water soluble at ambient temperature.

8. The method of claim 1, wherein the fiber comprises a polylactide fiber.

9. A method of delivering fibers into a well treatment fluid, the method comprising:
providing an aqueous based treatment fluid;
adding one or more degradable packages containing the fibers to the treatment fluid, wherein the one or more degradable packages comprises respective container shells that include a first layer of cellulosic film external to a second layer of polyvinyl alcohol film, and wherein the fibers are encapsulated by the first layer of cellulosic film and the second layer of polyvinyl alcohol; and
mixing the treatment fluid, causing the one or more degradable packages to degrade, dissolve, and release the fibers into the well treatment fluid at surface.

10. The method of claim 5, wherein the one or more degradable packages have a width between about 0.5 inches (in.) to about 1 in.

11. The method of claim 9, wherein the fibers are vacuum packed into the one or more degradable packages.

12. The method of claim 9, wherein the respective container shells have a thickness of about 50 microns to 100 microns.

13. The method of claim 9, wherein the fibers are disposed within the second layer of polyvinyl alcohol film.

14. The method of claim 9, wherein the first layer of cellulosic film and the second layer of polyvinyl alcohol further encapsulate one or more particulates, one or more crosslinkers, one or more breakers, or one or more corrosion inhibiters, or a combination.

15. The method of claim 9, wherein the one or more degradable packages are water soluble at ambient temperature.

16. The method of claim 5, wherein the fibers comprise a polylactide fiber.

* * * * *